United States Patent [19]  [11] 3,744,239
I'Anson  [45] July 10, 1973

[54] CHAIN LINK WITH EXTENDED WEAR SURFACE

[76] Inventor: Thomas I'Anson, 4014 Hunts Point Road, Bellevue, Wash. 98004

[22] Filed: Dec. 20, 1971

[21] Appl. No.: 209,695

[52] U.S. Cl. .......................... 59/84, 59/90, 152/144
[51] Int. Cl. ............................................ F16g 15/12
[58] Field of Search ...................... 59/84, 78, 90, 35, 59/80, 82, 8; 198/189; 152/231, 244; 74/255 R, 255 C, 250 R

[56] References Cited
UNITED STATES PATENTS

| | | | |
|---|---|---|---|
| 857,449 | 6/1907 | Currie | 59/84 |
| 2,093,547 | 9/1937 | Campbell | 59/35 |
| 3,453,823 | 7/1969 | Mundt | 59/90 |

Primary Examiner—Charles W. Lanham
Assistant Examiner—Gene P. Crosby
Attorney—Christensen & Sanborn

[57] ABSTRACT

A chain link having an extended wear surface for the bearing engagement with adjacent chain link is provided herein. The link comprises a pair of shank elements positioned substantially parallel to one another engaging a pair of rounded end lements having extended wear surfaces thereon. The arcuate ends afford full bearing surface contact when the chain is under tension. The wear surface is substantially toroidal in shape and is defined by a first interior chain link radius taken in the plane of the link and a second radius taken on a plane perpendicular to the plane of the link, the first and second radii being equal. A substantially increased wear surface with an inherent full surface contact interfit with a similarly formed interlinked adjacent chain link results.

8 Claims, 6 Drawing Figures

PATENTED JUL 10 1973
3,744,239
Fig. 1.
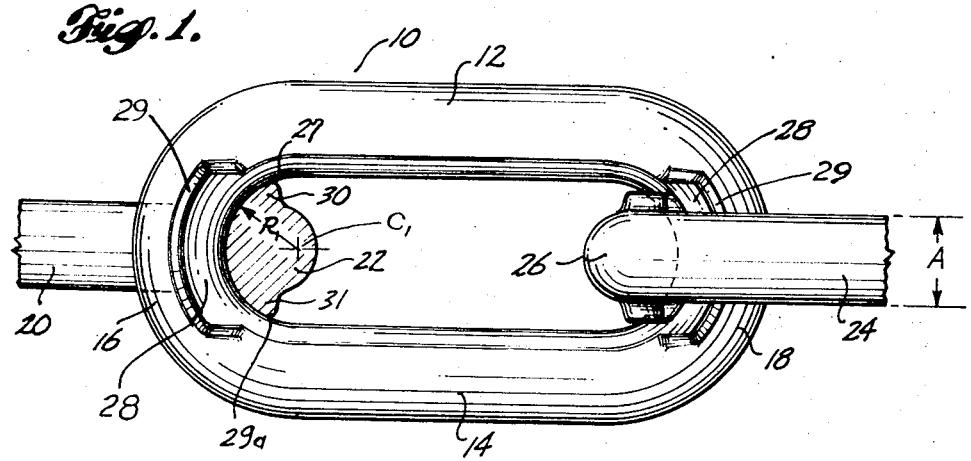
Fig. 2.
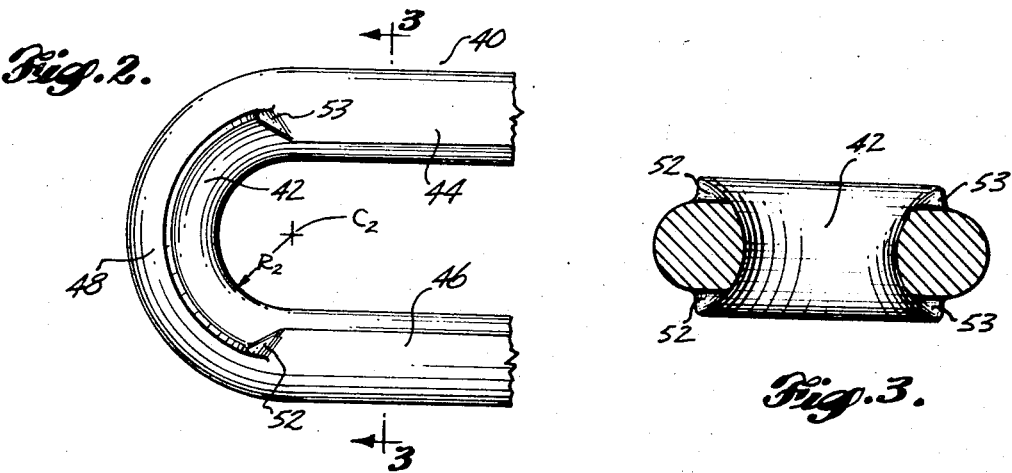
Fig. 3.
Fig. 4.
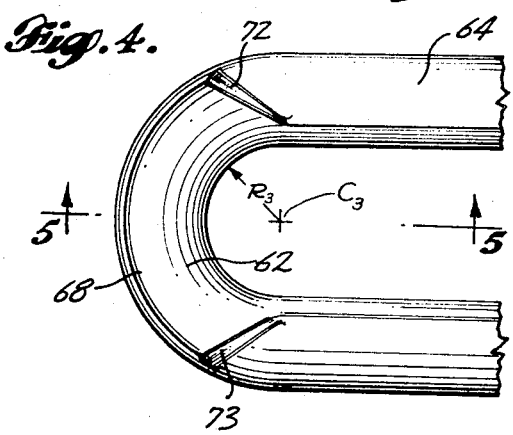
Fig. 5.
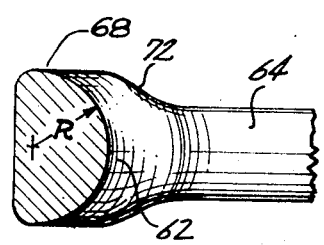
Fig. 6.
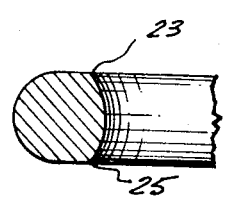

CHAIN LINK WITH EXTENDED WEAR SURFACE

FIELD OF THE INVENTION

This invention relates generally to improvement in link-type chains adapted for heavy duty service such as, for example, log-haul chains, conveyor chains and the like used in the wood products industries. The chains provided herein may also find use in ship anchor chains, drag line excavator buckets and the like.

BACKGROUND OF THE INVENTION

It is known in the prior art to provide heavy link-type chains with mating wear surfaces on the adjacent chain links so that bearing pressures are spread over the maximum area limited by the width of the chain link. Such devices provide for full surface contact between the adjacent chain links. The bearing surface in such devices is so shaped that it is partially complimental to a counterpart of itself located at right angles and in a posed relation thereto. An example of such link structure is shown in U.S. Pat. No. 2,650,470. While the device shown in this patent was a very substantial advance in the art, it, along with all other chains of this general type known heretofor suffers from the inherent limitation that the wear surface contact area is limited by the thickness of the chain link. While the cited patent reference enhanced substantially the life of link-type chains by providing a full surface contact interfit between adjacent chain links, such links wear out rapidly due to the limited wear surface area. Bearing surface area is a major factor in chain link wear and heretofor all link chains have limited the wear surface area by the link thickness. Wear can be improved by increasing the link thickness but only at the very serious problems of increased material costs and increased weight.

U.S. Pat. No. 3,453,823 provides for a slightly larger wear surface area but again this device is limited in surface area by the nominal planes defining the thickness of the link. In addition the link shown in this reference decreases in width from the center to the rounded ends thereof, severely limiting the possible surface area for wear contact between links. Furthermore, chains of this structure could not be used in the applications contemplated for the invention disclosed herein due to the presence of the central cross-strut 13 and by the fact that the flat edges of the link do not lie in a single plane but rather are each defined by two planes angled with respect to each other. Such a configuration could not be used in applications such as is exemplified by the Inventor's issued U.S. Pat. No. 3,311,220 showing a sprocket wheel widely used in the forest products industries. One requirement for a chain for use with this type (and other types) of sprocket for long link chains is the absence of obstructions in the center of the link, permitting insertion of sprocket teeth. Another requirement is the presence of a flat bearing surface on the sides of the link to engage the flat wear pads. Thus, the chain link shown in U.S. Pat. No. 3,453,823 and similar devices known in the prior art, even if made of a suitable material for use in the forest products industries and related applications as long link chains, inherently because of its structure and limitations cannot be used as an extended life long link chain.

Chain failure results at the rounded end segments of prior art long link chains after significant wear due to the decreased metal cross section. Sufficient strength in the shank portions of link chains can be attained with a smaller cross section than the prior art has found necessary to accommodate the inevitable wear of the chain end portions.

Replaceable wear surfaces have also been provided by the prior art in chain links but such replaceable wear surfaces do not add to the overall strength of the chain link and on the contrary are frequently found to decrease the overall strength obtainable in a particular size of link. Furthermore, such links inherently require occasional replacement of the wear surface, and being of a less ductile material, fracturing and breakage of the work surface is not an uncommon occurrence.

OBJECTS OF THE INVENTION

It is one object of the present invention to provide a chain link having a bearing surface so shaped that it is fully complimental to a counterpart of itself located at right angles and in a interlinked relation thereto, which is further characterized by having an extended wear surface to substantially increase the surface area contact provided by the prior art devices and substantially increase the overall wear characteristics, useful life and strength of a long link type chain link.

A further object of this invention is to provide a chain link having an extended wear surface projecting outwardly from the nominal surface planes of the chain link in a shape which provides an extension of the bearing surface complimental to a counterpart of itself formed in an adjacent and interconnecting chain link located at right angles thereto to provide a substantially enlarged extended wear surface.

SUMMARY OF THE INVENTION

In the manufacture of a link chain by foundry methods it is desirable for reasons of economy as well as ultimate chain strength that the links each be of a unitary construction and be simultaneously castable in interlinked relation or in the alternative be cast in a two step process in which half of the chain links are initially cast and the second half of the links cast in a second step in an interconnecting fashion with the first cast links. It is common practice to cast the links with wear surfaces designed to provide the optimum interfitting contact between the adjacent chain links. The present invention provides for the addition of a projecting member or lobe on each side of the link ends incorporating therein an extension of a torroidal wear surface. The projection is molded as an integral part of the chain link and contributes significantly to both the wear life and strength of the chain link. The added wear surface area taught by this invention may readily provide more than double the surface area heretofor utilized in chain links while adding very little to the total weight of the link. The wear surface area may be described as saddle-shaped, having convex elements in plane normal to the nominal plane of the link and concave elements in the longitudinal transverse planes, each of said elements having the same degree of curvature in the direction of pull corresponding to their counterpart in an adjacent and perpendicularly oriented interconnected link so that the two adjacent links will inherently interfit with full surface contact. Thus, each wear surface is toroidal in shape. The extent of the projection is limited only by the interior link diameter, and provides a very significantly increased wear surface area beyond that obtained in conventionally formed chain links.

The wear surface comprises a torus defined by the locus of points described by the rotation of a circular segment of a radius equivalent to the inner radius of the chain link rotated at a distance of that inner radius from the center of the link end. The wear surface of a corresponding interlinked chain link provides full engagement over the maximum surface area for any given chain link inner radius. The circle segment used to generate the torus may approximate a semicircule fixed at its midpoint to a generating arm of length equal to the inner radius of the chain link.

These and other objects and advantages of this invention will become more readily apparent from the following description thereof in conjunction with the accompanying drawings and the claims.

BRIEF DESCRIPTION OF THE DRAWINGS

FIG. 1 is a side view of an assembled link chain showing one complete link and parts of two adjacent links having the device of this invention included therein.

FIG. 2 is a side view of a portion of a chain link having a second embodiment of this invention incorporated therein.

FIG. 3 is a cross-sectional view of the device shown in FIG. 2 taken along lines 3—3 thereof.

FIG. 4 is a side view of a portion of a link chain having a third embodiment of this invention incorporated therein.

FIG. 5 is a cross-sectional view of the device shown in FIG. 4 taken along lines 5—5 thereof.

FIG. 6 is a cross-sectional view of a conventional chain link taken along a plane comparable to plane 5—5 of a FIG. 4 to show the prior art wear surface.

DETAILED DESCRIPTION OF PREFERRED EMBODIMENTS

Referring more particularly to the drawings wherein like numerals indicate like parts, there is seen in FIG. 1 a link-type chain made up of chain link 10, a first adjacent link chain 20 which has a portion thereof removed to show a cross-sectional view of the rounded link end 22, and a second adjacent chain link portion 24. By removal of a portion of link 20, the configuration of the wear surfaces of the two links 10 and 20 may be observed. The nominal center plane of each successively adjacent link is oriented perpendicular to the preceding link, thus forming a link chain of the type generally known to the prior art. The device of this invention is incorporated as the wear surface of each of the chain links shown. Link 10 is comprised of a pair of shank elements 12 and 14 connected together by rounded end elements 16 and 18. Shank elements of each chain link are bounded by a pair of parallel planes, not shown in the figures, which are separated by the thickness A of the shank elements (shown with respect to link 24). The surfaces of the shank elements 12 and 14 which lie in the above described planes are designed to engage the wear surfaces provided on sprockets such as is shown in U.S. Pat. No. 3,311,220.

Each rounded end of link 10 has an extended wear surface 28 which is comprised of the interior portion of the rounded end 16 and the extended portion 29 projecting outwardly beyond the planes bounding shank elements 12 and 14. The first adjacent chain link 20 has a rounded end section 22 having a pair of extended portions 30 and 31 which define the extended wear surface of this invention. The interior of the chain link 20 has an inside radius $R_1$ equivalent to the radius $R_1$ of the perpendicularly disposed chain element 10 such that adjacent chain links each contain extended wear surfaces which mate providing a substantially increased area of contact to extend the wear life of the chain. In addition, the added material in the lobe 30 and 31 substantially increase the strength of the rounded end section 22 thus increasing the overall strength of the chain insofar as failure in the rounded end section 22 is concerned.

In the example of a typical link type chain the wear surface area may be more than doubled over the area provided in prior art chain links by the use of the concepts of this invention. For example, in the conventional chain shown in FIG. 6, the wear surface area will be defined by the perpendicularly oriented circumferential lengths from the location 23 to the location 25, a distance of approximately 1.25 inches for the typical prior art 8-inch chain link. The area of contact will therefore be approximately that distance squared or 1.5 square inches. With the extended wear surface on the chain links shown in FIG. 1 the contact area will be defined by the circumferential length from point 27 to point 29a, a distance of approximately 2.5 inches for an 8-inch link resulting in a wear surface area of approximately 6.25 square inches. Thus, an increased wear surface area providing very substantially increased chain life and strength without substantially increasing the cost of manufacture or weight of the chain links can be obtained by constructing the links as taught herein.

The wear surfaces shown in FIG. 1 on links 10, 20 and 24 each comprise a saddle-shaped surface which is a portion of a torus. In link 10 the surface is defined by the rotation of a circle segment of radius $R_1$ in the nominal center plane of the link about point $C_1$ at a distance $R_1$ therefrom. The wear surface 28 extends outwardly from the planar edges of link 10 a distance so that the overall thickness of the link at the rounded portions is slightly less than $2R_1$, providing a very substantially increased area of contact between adjacent links. By having lobes 30 and 31 of the shape shown, a minimum amount of additional material and link weight is found to be necessary to form the extended wear surfaces.

Since the maximum angle between adjacent links under load in most long link chain applications is in the range of 15°–30° the wear surfaces shown in FIG. 1 are adequate for most applications. Sufficient contact between adjacent links is achieved within this operating angle range, wherein the wear surface occupies only the portion of the rounded end 16 as shown.

In FIG. 2 a second embodiment of this invention is shown in which the extended wear surface 42 occupies substantially all of curve length defined by the rounded end 48 of chain link 40. The tapered ends 52 and 53 of wear surface 42 which define the outer extremities thereof, terminate at approximately the location of intersection between the parallel disposed shanks 44 and 46 with the rounded ends 48. The contour of wear surface 42 is shown in detail in FIG. 3 and constitutes a portion of the torus surface generated by a circle of radius $R_2$ when rotated on a radius of length $R_2$ about point $C_2$ in the plane of the link 40.

The configurations shown in FIGS. 2–5 may advantageously be utilized in most long link chain applications wherein the angle between adjacent links approaches or exceeds 45° to 60° so that sufficient wear surface contact is maintained under all angular positions assumed by the chain under load.

In FIGS. 4 and 5 another alternative embodiment is shown in which the entire rounded end portion of the chain link is expanded in size to a shape which has a cross section as shown in FIG. 5 approximating a half circle. This embodiment provides the same saddle-shaped wear surface as provided in the embodiments shown in FIGS. 1 and 2 but requires additional material in the rounded end portion. Care must be taken in the fabrication of this embodiment of the invention to avoid the formation of voids during cooling and thermal contraction of the link. Frequently, it is necessary to provide a riser to the mold area at the rounded end 68 to compensate for such shrinkage.

FIG. 6 shows a portion of a prior art chain link such as that utilized in the inventor's issued U.S. Pat. No. 3,246,731, showing the limited wear surface available in the prior art chain links. The surface area from point 23 to point 25 provides the total surface area for wear. It is readily seen that a substantial surface area increase and a commensurate increase in chain life occurs by using the invention taught herein as shown by the preferred embodiments described in detail above with reference to FIGS. 1-5.

The materials utilized in forming the link chain of this invention are those metals commonly provided for heavy duty link chain. The inventor has found that a manganese steel which has the property of work hardening provides an optimum combination of strength, wear and cost.

These and other aspects of the invention will be evident to those skilled in the art based on the present disclosure of the preferred embodiments and practice of this invention.

I claim:

1. An interlinked chain made up of chain links each comprising a pair of shank elements engaging a pair of rounded end elements to form a closed loop, at least one of said rounded end elements have an interiorly disposed wear surface interfitting with a corresponding wear surface on an adjacent and interlinked chain link, said wear surface having the marginal edges thereof extending beyond nominal planes defining the thickness of said shank elements to provide an extended wear surface.

2. The chain of claim 1 wherein said wear surface is toroidal.

3. The chain of claim 2 further characterized by said toroidal surface being generated by a segment of a circle of a radius rotated in the plane of said link at a distance substantially equal to said radius from a point defining the center of said rounded end.

4. The chain of claim 1 wherein said shank elements are parallel.

5. The chain of claim 3 wherein said segment of a circle is a semicircle.

6. A chain link incorporated in an interlinked chain conveyor or the like, said link comprising an endless loop including upper and lower shank elements joined by rounded ends, at least one of said rounded ends having an interiorly disposed, extended wear surface adapted to engage a like wear surface on an adjacent interlinked chain link, said surface comprising a portion of a substantially toroidal surface extending beyond nominal planes defining the thickness of said link to maximize the area of said wear surfaces.

7. The apparatus of claim 6 wherein the curve generating said toroidal surface is a semicircle.

8. The apparatus of claim 6 wherein said upper and lower shanks are substantially parallel.

* * * * *